United States Patent [19]

Brudy

[11] 4,186,905
[45] Feb. 5, 1980

[54] RETRACTABLE TRUCK MIRROR

[75] Inventor: Otto Brudy, Windsor, Canada

[73] Assignee: Dominion Auto Accessories Limited, Toronto, Canada

[21] Appl. No.: 722,473

[22] Filed: Sep. 13, 1976

Related U.S. Application Data

[63] Continuation of Ser. No. 585,136, Jun. 9, 1975, abandoned.

[51] Int. Cl.² .................... A47G 1/24; E05D 11/08
[52] U.S. Cl. ......................... 248/478; 248/289 R; 403/97; 16/141
[58] Field of Search .................... 16/82, 139–142; 248/476–480, 486, 289, 291; 403/91, 93, 97

[56] References Cited

U.S. PATENT DOCUMENTS

| 514,890 | 2/1894 | Heilmann | 16/141 |
| 784,104 | 3/1905 | Caley | 16/140 |
| 931,810 | 8/1909 | Tapling | 16/141 |
| 1,834,193 | 12/1931 | Williams | 16/141 |
| 2,097,651 | 11/1937 | Stangeland | 16/141 |
| 3,384,334 | 5/1968 | Malachowski | 248/478 |
| 3,730,474 | 5/1973 | Bowers | 248/478 |
| 3,784,149 | 1/1974 | Brudy | 248/478 |
| 3,875,610 | 4/1975 | Wubbe et al. | 403/97 |

FOREIGN PATENT DOCUMENTS

| 9687 | 11/1902 | Fed. Rep. of Germany | 16/141 |
| 364243 | 8/1906 | France | 16/141 |
| 5990 | of 1900 | United Kingdom | 16/141 |
| 19741 | of 1912 | United Kingdom | 16/141 |
| 1123693 | 8/1968 | United Kingdom | 248/289 |

Primary Examiner—Lawrence J. Staab
Attorney, Agent, or Firm—Barnes, Kisselle, Raisch & Choate

[57] ABSTRACT

A truck mirror comprising a U-shaped support on which a mirror is pivotally mounted. The ends of arms of the support are pivoted to vertically spaced brackets that are adapted to be mounted on the truck. Pivot means are provided between the ends of the support arms and the brackets and comprise two members of low friction material fixed to the arms. The pivot members define a chamber in which an axially movable member is positioned. One of the pivot members has axially extending circumferentially spaced grooves therein and a movable member has complementary projections. The movable member is yieldingly urged toward the member having the grooves such that the mirror is held in angularly adjusted position but may be readily moved to a new angular position by manual manipulation.

1 Claim, 4 Drawing Figures

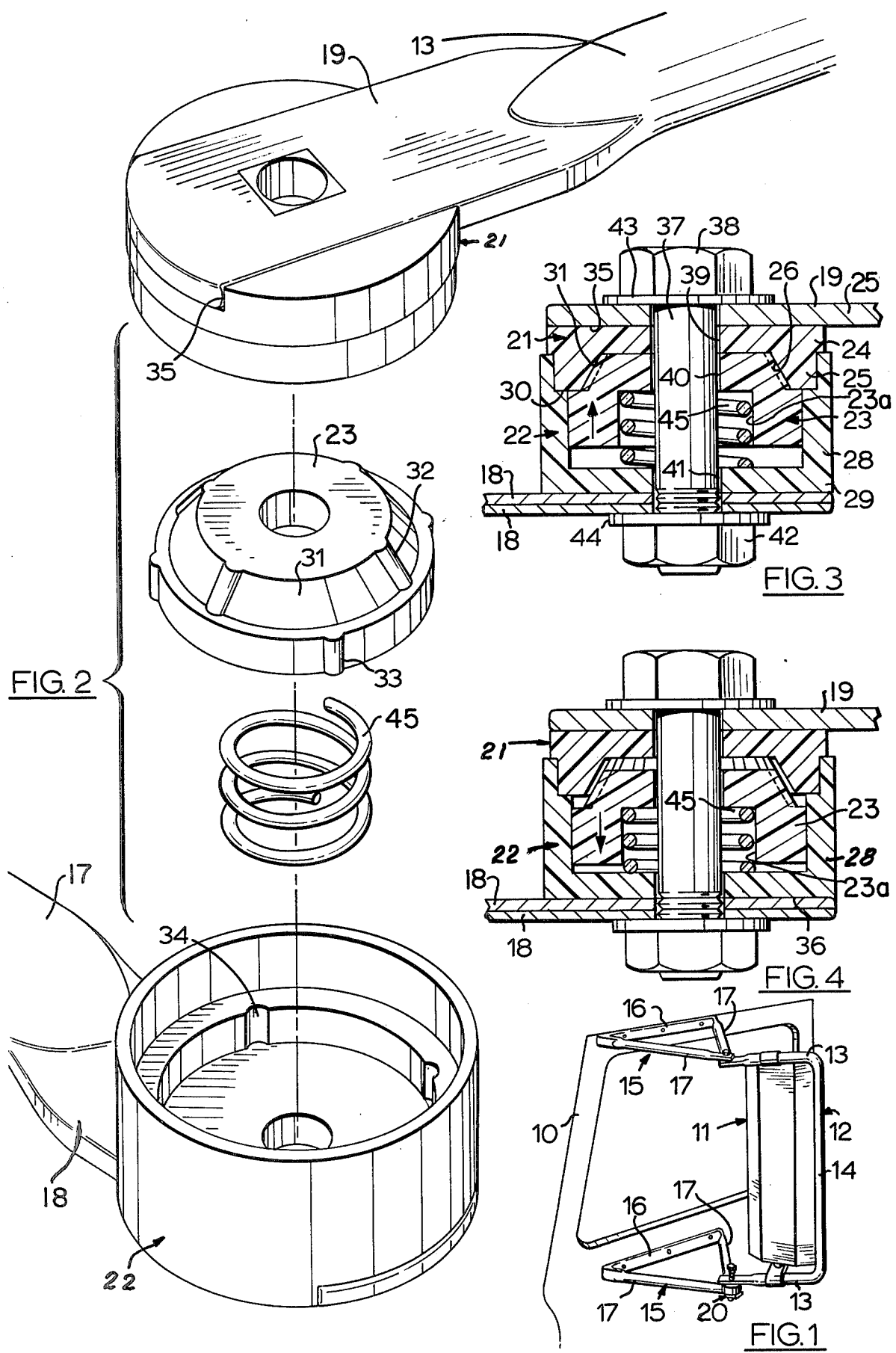

ated legs 17 that have flattened ends 18 that overlap
RETRACTABLE TRUCK MIRROR This is a continuation of application Ser. No. 585,136, filed June 9, 1975; abandoned.

This invention relates to truck mirrors and particularly to adjustable truck mirrors.

BACKGROUND OF THE INVENTION

In truck mirrors, which are required by law in many governmental jurisdictions, it is common and desirable to provide for initial adjustment of the mirror to accommodate the driver and at the same time to provide a construction wherein the mirror can be readily retracted or moved out of its projected position for clearance and thereafter readily moved back to its adjusted position without the use of tools. Various designs have been heretofore proposed which required complicated constructions. Another problem with respect to the such constructions has been that of corrosion after prolonged use.

In the U.S. Pat. No. 3,784,149, issued Jan. 8, 1974, having a common assignee with the present application, there is disclosed and claimed a truck mirror wherein the mirror is supported on a U-shaped support. The ends of the arms of the support are pivoted to vertically spaced brackets that are adapted to be mounted on the truck. Pivot means are provided between the ends of the support arms and the brackets and comprise two members of low friction material. One of the members has axially extending circumferentially spaced grooves therein and the other of the members has complementary projections. The members are yieldingly urged toward one another such that the mirror is held in angularly adjusted position but may be readily moved to a new angular position by manual manipulation. Such a construction has been found to be very effective but may be objectionable in that it has an exposed external spring.

Among the objects of the present invention are to provide an improved novel truck mirror construction wherein the angular position of the mirror can be readily adjusted, changed for clearance and returned to its original position without the use of tools and which obviates the aforementioned problems.

SUMMARY OF THE INVENTION

In accordance with the invention, the pivot means comprises two members of low friction material fixed to the arms. The pivot members define a chamber in which an axially movable member is positioned. One of the pivot members has axially extending circumferentially spaced grooves therein and a movable member has complementary projections. The movable member is yieldingly urged toward the member having the grooves such that the mirror is held in angularly adjusted position but may be readily moved to a new angular position by manual manipulation.

DESCRIPTION OF THE DRAWINGS

FIG. 1 is a fragmentary perspective view of a truck mirror construction embodying the invention.

FIG. 2 is a fragmentary exploded view of a portion of the mirror.

FIG. 3 is a fragmentary transverse sectional view.

FIG. 4 is a fragmentary view similar to FIG. 3 showing the parts in a different operative position.

DESCRIPTION

Referring to FIG. 1, the mirror construction embodying the invention is adapted to be mounted on a door or other portion of a truck or similar vehicle and comprises an elongated mirror housing 11 which is pivotally supported at its ends on a U-shaped support 12 comprising spaced arms 13 connected by vertical portion 14. Brackets 15 are fixed at vertically spaced points on the door 10. Each bracket comprises a base 16 and angularly related legs 17 that have flattened ends 18 that overlap one another. The ends of the arms 13 are flattened as at 19.

Pivot means 20 are provided between the bracket arms 17, 18 and the support arms 13 at each bracket or at only one bracket.

Each pivot means 20 comprises pivot members 21, 22 and a movable member 23. Pivot member 21 includes a generally cylindrical imperforate wall 24 and a base 25. The inner surface 26 of cylindrical wall 25 is frustoconical and has circumferentially spaced axially extending grooves 27 therein, the axes of which are inclined to the axis of the member 21. Pivot member 22 is generally cylindrical and includes a generally cylindrical imperforate wall 28 and a base 29. Movable member 23 is generally cylindrical and telescopes within wall 28. The wall 24 of pivot member 21 telescopes within the wall 28 of pivot member 22 and abuts a shoulder 30. The upper end of movable member 23 is generally conical and has an inclined outer peripheral surface 31 which is frusto-conical and generally complementary to surface 26 and is formed with circumferentially spaced projections 32 that are complementary to the grooves 27 and have axes inclined with respect to the axis of the member 22. The configuration of the grooves 27 and projections 32 is generally U-shaped but is such that when the grooves and projections are in engagement as presently described, the apex of each projection 32 is spaced from the base of each groove 27.

The periphery of the cylindrical portion of movable member 23 is formed with axial ribs 33 which engage complementary grooves 34 in wall 28 to guide the movable member for movement axially and restrain the movable member against movement angularly relative to the pivot member 22.

Pivot member 21 is formed with a transverse groove 35 into which the flattened portion 19 of arm 13 extends. Similarly, pivot member 22 is formed with transverse groove 36 into which the flattened portion 18 of the leg 17 extends. A bolt 37 having a head 38 extends through openings 39, 40, 41 in members 21, 23, 22 and a nut 42 is threaded on the end of the bolt 37. Washers 43, 44 are interposed between head 38 and leg 13 and between the nut 37 and leg 15. A compression spring 45 is interposed between wall 29 and entends into cavity 23a formed by the cylindrical portion of movable member 23 thereby providing a compressive force such that the movable member 23 and pivot member 21, 22 are urged axially toward one another.

When assembled, the manual manipulation of the support 12 causes the pivot member 21 to be rotated angularly with respect to the support member 22. During this movement, axial compression of the spring 45 is achieved so that grooves 27 move successively into engagement with projections 32. When it is desired to re-adjust the mirror for clearance or for use by drivers of different physical proportions, the support 12 is again grasped to move the mirror to the desired position. In any position, the mirror is firmly held in its adjusted position.

The pivot members 21, 22 are preferably made of a low friction material such as plastic. A satisfactory material comprises nylon.

Since the entire operating mechanism is within a chamber defined by the pivot members 21, 22, the mechanism is protected from the elements and damage.

I claim:

1. In a mirror, the combination comprising
pivot means comprising a first pivot member,
a second pivot member,
each said pivot member comprising a cylindrical wall and a base,
said cylindrical walls of said first and second pivot members telescoping within one another and including abutting portions limiting axially inward telescoping movement between said pivot members to define a closed chamber,
said abutting portions comprising longitudinally spaced radially extending surfaces,
a movable member in said closed chamber having a cylindrical portion, a frusto conical portion and a base on the frusto conical portion,
the diameter of said cylindrical portion of said movable member being substantially equal to the internal diameter of said cylindrical wall of said second pivot member,
a mirror,
a mounting bracket,
one of said pivot members being mounted on said mirror and the other being mounted on said bracket,
means extending axially through said pivot members and said movable member for holding said pivot members in assembled relation to maintain said chamber closed while permitting relative rotational movement between said pivot members,
axially extending ribs on the cylindrical portion of said movable member and complementary grooves on the cylindrical wall of said second pivot member for guiding said movable member for axial movement relative to said second pivot member and restraining said movable member against angular movement relative to the inner surface of said cylindrical wall of said second pivot member,
the inner surface of said cylindrical wall of the first said pivot member being frusto conical and having a plurality of circumferentially spaced generally axially extending grooves therein,
said frusto conical portion of said movable member having a plurality of circumferentially spaced axially extending generally complementary projections thereon,
each of said grooves and said projections on said first pivot member and said movable member having an axis inclined to the axis of the respective members,
and a spring interposed between the base of said second pivot member and the base of said movable member whereby said pivot members are held in angularly related fashion with respect to one another to hold the mirror in position but may be moved to a new angularly related position by moving the mirror angularly with respect to the bracket to cause said projections to move axially out of engagement with said grooves and circumferentially and axially into engagement with others of said grooves,
said movable member including a recess surrounded by the cylindrical portion thereof such that the spring extends into said recess and is surrounded by the cylindrical portion of said movable member.

* * * * *